May 6, 1941.    J. H. BEACH    2,240,540
REFRIGERATION
Filed March 25, 1939

INVENTOR
Justice H. Beach
BY
Harry S. Dumasse
ATTORNEY

Patented May 6, 1941

2,240,540

UNITED STATES PATENT OFFICE 2,240,540

REFRIGERATION

Justice H. Beach, Canton, Ohio, assignor to The Hoover Company, North Canton, Ohio, a corporation of Ohio Application March 25, 1939, Serial No. 264,105

19 Claims. (Cl. 62—5)

This application relates to the art of absorption refrigerating systems and more particularly to an apparatus and method for regulating such systems under varying load conditions.

Heretofore considerable difficulty has been experienced in the construction of absorption refrigerating systems of the type utilizing an inert pressure equalizing medium which is circulated by a constantly operating constant speed fan and in which the solution is circulated by a gas lift pump to which pumping gas is supplied at a substantially constant rate. This difficulty arises principally from the fact that the rate of refrigerant generation is frequently controlled in response to variations in the load demand by varying the rate of heat application to the boiler. As a result of this combination of substantially constant solution circulation due to the constant rate of supply of pumping gas to the circulating pump and varying rates of heat application to the boiler, the apparatus will not operate efficiently over any appreciable range of loads. If the system is designed to operate efficiently with maximum heat input to the boiler, the spread between the concentrations of strong and weak solution will decrease to an alarming degree when the control mechanism decreases the rate of heat application to the boiler in response to a lightening of the load on the system whereby the efficiency and operating characteristics of the system as a whole are seriously impaired. The same difficulties arise regardless of the point at which the machine reaches its maximum efficiency.

Accordingly, it is a principal object of this invention to devise a refrigerating system of the type above referred to in which means are provided automatically to regulate the rate at which the absorption solution is circulated in accordance with variations in the load or demand for refrigeration to maintain the refrigerant concentration in the various parts of the solution circuit at proper values.

It is a further object of the present invention to provide a three-fluid absorption refrigerating system of the type in which a substantially constantly operating fan is provided to circulate the inert gas and in which the solution is circulated by means of a gas lift pump in which the quantity of solution in the active portions of the solution circuit is varied in accordance with variations in the load.

It is a further object of the invention to provide an absorption refrigerating system of the type above referred to in which the rate of solution circulation is altered with variations in the demand for refrigeration by altering the depth of immersion of the circulating pump.

It is a further object of the present invention to provide an absorption refrigerating system provided with a control means operable to regulate the rate at which refrigerant vapor is generated in response to the demand for refrigeration and provided with means which automatically regulate the rate of solution circulation in accordance with the rate of refrigerant generation or the demand for refrigeration.

Other objects and advantages of the invention will become apparent as the description proceeds when taken in connection with the accompanying drawing, in which—

Figure 1:
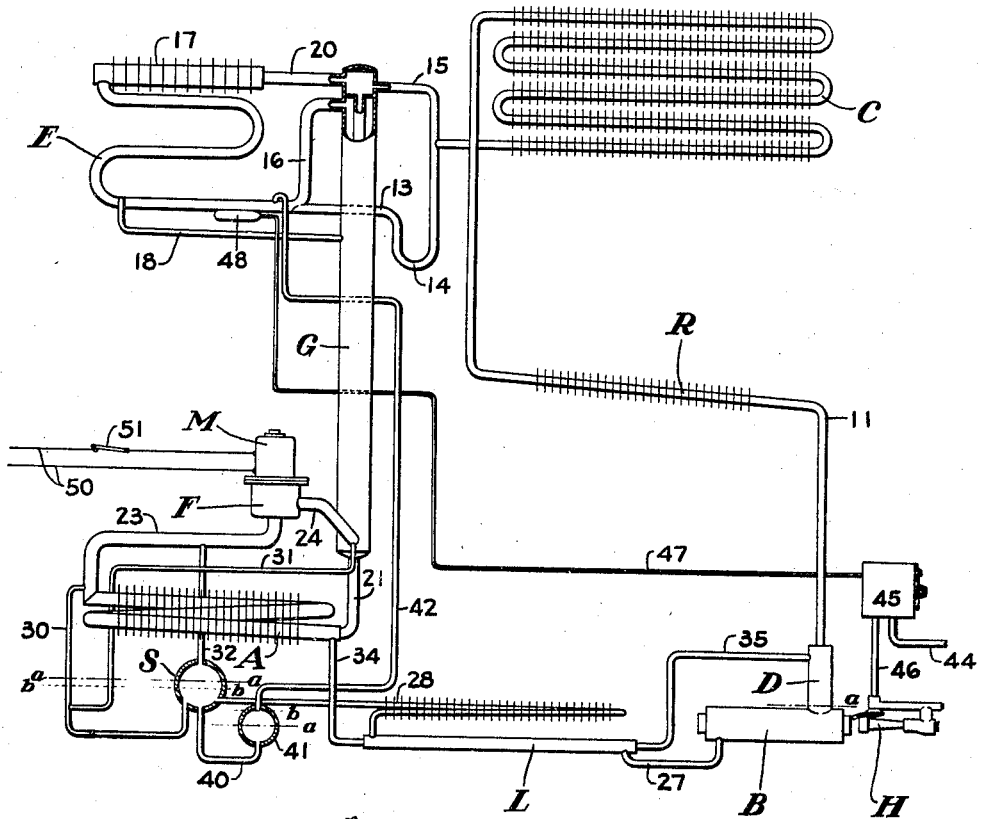
Figure 1 is a diagrammatic representation of an absorption system of the three-fluid type embodying the present invention.

Referring now to the drawing in detail and first to Figure 1 thereof, there is disclosed a three-fluid absorption refrigerating system comprising a boiler B, an analyzer D, a rectifier R, a tubular air-cooled condenser C, an evaporator E, a gas heat exchanger G, an absorber A, a solution reservoir S, a liquid heat exchanger L, a circulating fan F, and an electrical motor M for driving the fan. These mechanisms are suitably connected by various conduits to form a plurality of gas and liquid circuits constituting a complete refrigerating system to which reference will be made in more detail hereinafter.

The above described refrigerating system will be charged with a suitable refrigerant, such as ammonia, a suitable absorbent therefor, such as water, and an inert pressure equalizing medium, preferably a dense inert gas like nitrogen.

Refrigerant vapor is generated from the strong solution contained in the boiler B by the application of heat thereto. In this instance the heater is shown as a gas burner H though other types of heaters may be utilized. The refrigerant vapor so generated passes upwardly through the analyzer D in counterflow to strong solution flowing downwardly therethrough. Further refrigerant vapor is generated in the analyzer D from the strong solution, the heat of generation being supplied by the condensation of absorption solution vapor which passes into the analyzer from the boiler. The refrigerant vapor so generated is conducted from the top portion of the analyzer D to the upper portion of the condenser C by means of a conduit 11 which includes the air-cooled rectifier R. The rectifier serves to condense any vapor of absorption solution which may pass through the analyzer D.

The vapor supplied to the condenser is liquified therein by heat exchange with air flowing over the exterior walls of the condenser and in contact with the cooling fins mounted thereon. The refrigerant liquid so formed is conveyed from the bottom portion of the condenser C into the bottom portion of the evaporator E by means of a conduit 13 which includes a depending U-shaped pressure balancing column portion 14 as illustrated. The condenser side of the U-shaped portion 14 of the conduit 13 is vented into the gas discharge side of the gas heat exchanger G by means of a conduit 15.

The evaporator E will be constructed in such fashion that the inert gas travels therethrough at a velocity sufficient to sweep or drag the liquid refrigerant therethrough. The liquid refrigerant and pressure equalizing medium are preferably supplied to the bottom portion of the evaporator E for this purpose. The evaporator E is shown herein diagrammatically. It may be constructed in any desired manner, a preferred construction being disclosed and claimed in the co-pending application of Curtis C. Coons and William H. Kitto, Serial No. 220,189, filed July 20, 1938. The evaporator drain is connected by means of a conduit 18 to the gas heat exchanger. In the evaporator the liquid refrigerant evaporates into the inert gas stream as the gas is circulating the same through the evaporating conduit until it discharges into the box-cooling portion 17 of the evaporator through which the liquid may flow by gravity or may be propelled in the manner heretofore mentioned. The resulting rich pressure equalizing medium formed in the evaporator E is conveyed from the box-cooling portion 17 thereof to the rich gas side of the gas heat exchanger G by means of a conduit 20. After passing through the gas heat exchanger G the rich gas is conveyed therefrom by means of a conduit 21 into the bottom portion of the tubular inclined air-cooled absorber A through which it flows upwardly in counterflow relationship to the absorption solution which is flowing downwardly through the absorber. The refrigerant vapor content of the pressure equalizing medium refrigerant vapor mixture is substantially absorbed in the solution in the absorber and the heat of absorption is rejected to cooling air flowing over the exterior walls of the absorber vessel and the air cooling fins mounted thereon. The resulting lean pressure equalizing medium formed in the absorber is conveyed from the upper outlet portion thereof to the suction inlet of the circulating fan F by means of a conduit 23. The pressure equalizing medium is placed under pressure by the circulating fan and is discharged therefrom into the outer or lean gas path of the gas heat exchanger G by means of a conduit 24. After traversing the gas heat exchanger the lean gas is then conveyed to the bottom portion of the evaporator E by the conduit 16 in the manner heretofore described.

The lean solution formed in the boiler by the application of heat thereto is conveyed to the solution reservoir S by means of the conduit 27, the outer path of the liquid heat exchanger L, and a conduit 28 which includes an elongated finned portion to provide a solution pre-cooler. The lean solution is conveyed from the solution reservoir S into the conduit 23 adjacent its point of connection with the absorber A by means of a gas lift conduit 30. It is apparent that the point of connection between the conduits 23 and 30 is materially above the liquid level normally prevailing in the boiler-analyzer system wherefore some means must be provided for elevating the lean solution into the absorber. For this purpose a small bleed conduit 31 is connected between the discharge conduit 24 of the circulating fan and the gas lift conduit 30 below the liquid level therein whereby the lean solution is elevated into the absorber by gas lift action. The top portion of the solution reservoir S is vented to the suction conduit 23 of the circulating fan F by means of a conduit 32 wherefore the gas lift pump 30, 31 is enabled to operate directly across the circulating fan F whereby the maximum pressure differential available in the system is utilized to circulate the absorption solution.

The lean solution supplied to the absorber flows downwardly therethrough in counterflow relationship to the rich pressure equalizing medium discharged from the evaporator in the manner heretofore described. The resulting strong solution flows to the bottom portion of the absorber A from which point it is conveyed to the upper portion of the analyzer D by means of a conduit 34, the inner path of the liquid heat exchanger L and the conduit 35, thus completing the absorption solution circuit.

The elements described immediately above may be said to constitute the active or circulatory portion of the absorption solution circuit. However, that circuit also includes what may be termed an inactive or non-circulatory portion to be described below. The bottom portion of the solution reservoir S is connected by means of a U-shaped conduit 40 to a small regulating reservoir 41 which is positioned at a level below the level of the solution reservoir S. The upper portion of the regulating reservoir 41 is connected by means of a conduit 42 to the bottom portion of the evaporator E adjacent the point at which the inert gas is supplied thereto from the conduit 16. The operation of this portion of the invention will be described in detail hereinafter.

The gas burner H which is positioned to heat the boiler B is supplied with fuel through a conduit 44, a modulating control 45, and a conduit 46. The control may be of any known type but is preferably of the type provided with a regulating valve interposed between the gas lines 44 and 46 which valve is operated by a thermostatic mechanism which includes a capillary connecting conduit 47 and a thermal bulb element 48 which will be positioned either adjacent the evaporator as shown or in the food storage compartment of the refrigerator box as desired. In the operation of this device variations in temperature adjacent the bulb 48 are reflected through the conduit 47 into a mechanism within the control box 45 which increases or decreases the amount of gas supplied to the burner H in response to changes in refrigeration demands.

In the present apparatus the circulating motor M preferably operates constantly and is energized from a suitable source of electrical energy by the wires 50 which may include a suitable cut-off switch 51.

The general arrangement of the refrigerating system herein disclosed with the exception of the control and the regulating reservoir 41 and its associated conduit is generally the same as that disclosed in my copending application Serial No. 220,204, filed July 20, 1938. As explained fully in my co-pending application, the arrangement of the vent 15 and the connecting conduits 13 and 14 between the condenser, evaporator, and gas heat exchanger allows the condenser, rectifier, boiler-analyzer assembly to operate under the discharge pressure of the evaporator which is not materially greater than the suction pressure of the circulating fan. The reservoir S, it will be noted, is vented directly to the suction inlet of the circulating fan wherefore the liquid level normally prevailing in the reservoir S will be slightly higher than that prevailing in the boiler-analyzer system because of the slightly higher pressure prevailing at the outlet of the evaporator than that prevailing in the suction side of the fan and also because of the gas flow resistance of the conduits connecting the boiler to the evaporator. This will permit the reservoir to be raised above the boiler to conserve space.

The liquid levels prevailing in the system when the heater H is operating at or substantially at its maximum capacity are indicated by dot and dash lines marked $a$. Under these conditions substantially the maximum possible amount of refrigerant vapor is being generated per unit of time in the boiler and as a consequence substantially the maximum possible amount of refrigerant liquid is being supplied per unit of time to the bottom portion of the evaporator E. Due to the fact that the liquid refrigerant is circulated through the evaporator by the propelling action of the inert gas stream thereon, the resistance to gas flow of the evaporator conduit and the liquid is a function of the quantity of liquid so supplied, wherefore the back pressure on the gas inlet conduit which leads into the evaporator will be at its maximum value when the control mechanism 45 is operating to supply the maximum quantity of gas to the burner H and consequently the back pressure in this conduit will decrease as the control 45 operates to decrease the rate at which gas is supplied to the burner H. Thus, it will be seen that pressure variations occurring in the gas inlet portion of the evaporator are reflected through the conduit 42 onto the liquid maintained in the auxiliary or level regulating reservoir 41.

Now assume that the control is operated in response to a heavy refrigerating load to supply the burner H with the maximum quantity of gas. As a result of this action the maximum possible quantity of refrigerant will be generated per unit of time from the solution contained in the boiler and the maximum possible quantity of liquid refrigerant will be supplied to the evaporator. Therefore, the highest possible back pressure will exist in the conduit 42. As a result of this pressure in the conduit 42, which incidentally is always higher than the pressure in the conduits 20 and 15 by the amount of pressure drop between the gas inlet and outlet portions of the evaporator and is also higher than the pressure in the gas space of the solution reservoir S by the difference between the discharge and suction pressures of the circulating fan diminished by the pressure drop between the conduits 24 and 16, the liquid level in the auxiliary reservoir 41 is depressed approximately to the dash-dot line $a$ as indicated. This maintains the liquid level in the rest of the solution circuit at the dash-dot line $a$, thereby providing the maximum possible depth of immersion on the gas lift pump 30—the depth of immersion of the gas lift pump for the purposes of this application may be defined as the distance between the liquid level in the supply reservoir for the pump and the point at which the pumped gas is introduced thereinto. This is the highest point to which the liquid level in the circulating system may arise and consequently produces the maximum depth of immersion on the pump. With the depth of immersion on the pump at a maximum value, the rate at which the solution is circulated is also at a maximum which is desired because the system is operating at its maximum capacity and the solution is being stripped in the boiler at the maximum rate. Therefore, relatively strong solution may be supplied to the boiler and relatively weak solution may be supplied from the boiler to the absorber to permit the system to operate under the most efficient conditions.

However, as the refrigerating load diminishes due to the progressive lowering of the temperature of the material to be refrigerated, the control gradually throttles the supply of gas to the burner H and decreases the rate at which refrigerant vapor is generated and of course the rate at which refrigerant liquid is supplied to the evaporator E. The gas flow resistance of the evaporator decreases and the back pressure in the conduit 16 diminishes by a small amount as the rate of liquid supply to the evaporator decreases. This allows the liquid level in the auxiliary reservoir 41 to rise substantially to the point indicated by the dotted line marked $b$ because of the diminished pressure in the conduit 42. Due to this elevation of the liquid level in the reservoir 41, the liquid level in the circulating pump and in the solution reservoir S diminishes substantially to the point indicated by the dotted line marked $b$. The liquid level in the boiler-analyzer is not believed to fluctuate to any material extent because of the frictional resistance of the long conduit connecting the same with the solution reservoir and the absorber and also because of the fact that the condenser vent system tends to maintain a constant level in the boiler-analyzer though the level may lower slightly under the conditions just described. The liquid levels now being lowered to the point marked $b$, the depth of immersion of the gas lift pump 30 is decreased and the rate of solution circulation or the rate at which the pump elevates solution into the absorber is also decreased. This, however, is a desirable result as it descreases the rate of solution circulation through the boiler which permits the solution supplied thereto to be deconcentrated by substantially the same amount as before with a lower rate of heat supply thereto. This does not adversely affect the absorber as the inert gas circulating therethrough now carries a lesser quantity of refrigerant vapor to be absorbed because of the lesser quantity of refrigerant liquid evaporated per unit of time so that the optimum values of strong and weak solution and the spread between the strong and weak solution concentrations are maintained under all load conditions which will be met in operation of the apparatus.

The quantity of solution which is circulating in the active portion of the absorption solution circuit, the rate of solution circulation and the depth of immersion of the pump are at a maximum when the load on the apparatus is at its maximum value and are at a minimum when the load on the apparatus is at its minimum value.

Thus the quantity of solution which is flowing through the active portion of the absorption solution circuit, the depth of immersion of the circulating pump, the elevation through which the solution must be elevated, and the rate at which the solution is circulated are all varied automatically without the intervention of moving parts or by altering the condition of the constant speed constantly operating fan, but only by changes in the condition of certain portions of the apparatus automatically brought about when the control mechanism, alters the rate at which heat is supplied to the boiler and consequently the rate at which refrigerant liquid is produced in response to refrigeration demands.

Though the invention has been described in detail with reference to a gas lift pump it is not limited thereto. The herein disclosed method of varying the rate of solution circulation may be applied to other known types of pumps which are affected by variations in the head against which the pump operates or by variations in the head of liquid on the intake or suction side thereof.

Figure 2:
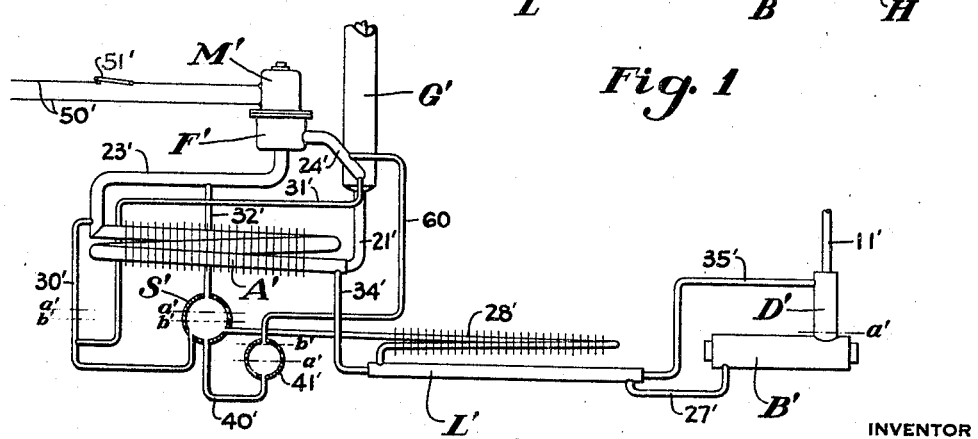
Figure 2 is a fragmentary diagrammatic representation of a refrigerating system embodying a modified form of the present invention.

Referring now to Figure 2 there is disclosed a modified form of the invention. Only a portion of the apparatus is shown, the remainder of the apparatus being identical with that illustrated and described in connection with Figure 1. Certain portions of the apparatus illustrated in Figure 2 are identical with corresponding portions illustrated in Figure 1 and are, therefore, given the same reference characters primed. It is apparent from Figure 2 that the sole difference between that form of the invention and the form disclosed in Figure 1 lies in the method by which the auxiliary reservoir 41' is connected to be responsive to variations in the back pressure on the evaporator induced by variations in the rate at which liquid is supplied thereto. In Figure 1 the reservoir 41 is connected by means of a conduit 42 directly to the gas inlet portion of the evaporator. In Figure 2 the reservoir 41' is connected by means of a conduit 60 directly to the gas discharge conduit 24' of the circulating fan F'. The form of the invention illustrated in Figure 2 is more compact and eliminates a very long conduit interconnecting the auxiliary reservoir and the evaporator.

The difference between the two forms of the invention is as follows: If the resistance to the gas heat exchanger is very material the form of the invention disclosed in Figure 1 is to be preferred as the pressure differential induced by changes in the rate at which liquid is supplied to the evaporator will not be apparent when reflected through a high resistance gas heat exchanger. On the other hand, if the resistance to the gas heat exchanger is very small as in the case when the exchanger consists simply of two concentric tubes, then the changes in the back pressure on the evaporator induced by varying the rate at which liquid is supplied thereto will be accurately reflected directly into the discharge part of the circulating fan and the auxiliary reservoir may be connected directly to the discharge of the fan without fear that it will not accurately respond to pressure differences induced by changes in the rate at which liquid refrigerant is supplied to the evaporator.

In this connection it must be noted that the drawing accompanying this application is not drawn to the scale as it is diagrammatic in character and in actual practice the variations in liquid level, or rather the variations in the depth of immersion of the circulating pump, may not vary more than approximately 1/8 of an inch for household size units, though that is sufficient to achieve the desired control of the refrigerating system.

The present invention, therefore, provides an absorption refrigerating system in which control is achieved by modulating the rate of heat supply to the generator and in which the rate of circulation of the absorption solution is automatically controlled by the condition of a portion of the system without in any way affecting the operation of the continuously operating constant speed circulating fan. This is achieved without the use of moving parts simply by changes in the design of the fluid circuit.

While the invention has been illustrated and described herein in considerable detail, it is not to be limited to the constructional details illustrated and described. Various changes in construction, arrangement and proportion of the parts may be made without departing from the spirit of the invention or the scope of the appended claims.

I claim:

1. In a three-fluid absorption refrigerating system, a generator, means to heat the generator, means for varying the rate at which heat is supplied to the generator in response to refrigeration demand, a constantly operating power driven absorption solution circulator, and means for altering the level of the absorption solution supplied to said solution circulator in response to refrigeration demand.

2. In a three-fluid absorption refrigerating system, a generator, means to heat the generator, means for varying the rate at which heat is supplied to the generator in response to refrigeration demand, a constantly operating power driven absorption solution circulator, and means responsive to a condition of the system which varies with the rate at which heat is supplied to the generator for altering the level of the absorption solution supplied to said absorption solution circulator.

3. In combination an absorption refrigerating system including a refrigerant vapor generator, a solution circuit, a gas lift pump in the solution circuit, means for regulating the rate of refrigerant generation in response to the demand for refrigeration, and means for varying the depth of immersion of the gas lift pump in response to refrigeration demand.

4. Absorption refrigerating apparatus comprising a pressure equalizing medium circuit including an absorber and an evaporator of the type in which the pressure equalizing medium circulates liquid refrigerant therethrough, a solution circuit including a generator and said absorber, refrigeration demand responsive means for regulating the rate at which refrigerant vapor is produced in said generator, a pump for circulating the pressure equalizing medium, a gas lift pump connected to receive pressure equalizing medium from said pressure equalizing medium circuit for circulating the solution, and means responsive to variations in pressure conditions in the pressure equalizing medium circuit for varying the effective head of solution on said pump.

5. Absorption refrigerating apparatus comprising a pressure equalizing medium circuit including an absorber and an evaporator of the type in which the pressure equalizing medium circulates liquid refrigerant therethrough, a solution circuit including a generator and said absorber, refrigeration demand responsive means for regulating the rate at which refrigerant vapor is produced in said generator, a pump for circulating the pressure equalizing medium, a gas lift pump connected to receive pressure equalizing medium from said pressure equalizing medium circuit for circulating the solution, and means responsive to variations in the resistance to flow of pressure equalizing medium through said evaporator for varying the effective head of solution on said pump.

6. Absorption refrigerating apparatus comprising a pressure equalizing medium circuit including an absorber and an evaporator, a solution circuit including a generator and said absorber, refrigeration demand responsive means for regulating the rate at which refrigerant vapor is produced in said generator, a pump for circulating the pressure equalizing medium, a gas lift pump connected to receive pressure equalizing medium from said pressure equalizing medium circuit for circulating the solution, and means responsive to variations in pressure conditions in the pressure equalizing medium circuit for varying the quantity of absorption solution actively circulating through said absorption solution circuit.

7. Absorption refrigerating apparatus comprising a pressure equalizing medium circuit including an absorber and an evaporator of the type in which the pressure equalizing medium circulates liquid refrigerant therethrough, a solution circuit including a generator and said absorber, refrigeration demand responsive means for regulating the rate at which refrigerant vapor is produced in said generator, a pump for circulating the pressure equalizing medium, a gas lift pump connected to receive pressure equalizing medium from said pressure equalizing medium circuit for circulating the solution, and means responsive to variations in the resistance to the flow of the pressure equalizing medium through said evaporator induced by changes in the rate at which refrigerant is supplied thereto for varying the effective head of solution on said pump.

8. That improvement in the art of refrigeration which includes the steps of liberating refrigerant vapor from solution in accordance with refrigeration demand, liquefying the vapor so liberated, evaporating the liquid into an inert gas, absorbing the vapor from the inert gas in an absorbing zone, applying a substantially constant circulating force to the solution to circulate the same between the absorbing and generating zones and varying the quantity of solution circulating between the absorbing and generating zones in accordance with the demand for refrigeration by altering the effective head against which the constant circulating force acts.

9. That improvement in the art of refrigeration which includes the steps of liberating refrigerant vapor from solution in accordance with refrigeration demand, liquefying the vapor so liberated, evaporating the liquid into a propelled stream of inert gas circulating between evaporating and absorbing zones, diverting inert gas into a rising body of solution to circulate the solution between the absorbing and generating zones, and varying the head of solution against which the diverted inert gas operates in response to pressure variations in the evaporating zone.

10. That improvement in the art of absorption refrigeration which includes the steps of varying the rate of refrigerant generation in accordance with the demand for refrigeration and maintaining the concentration of the refrigerant in the absorbent solution in the solution circuit by regulating the liquid levels therein in accordance with the demand for refrigeration.

11. That method of regulating the liquid levels in the solution circuit of a three-fluid absorption refrigeration system which includes the steps of subjecting one portion of the solution circuit to the pressure prevailing in a portion of the system in which the pressure does not normally vary and subjecting another portion of the solution circuit to the pressure prevailing in a portion of the system in which the pressure fluctuates with variations in the operating conditions thereof.

12. In combination with a three-fluid absorption refrigerating system having a solution circuit including a circulating pump, means for varying the operation of the pump with variations in the operating conditions of the system comprising means for subjecting parts of the solution circuit to a pressure differential which fluctuates in response to variations in the operating conditions of the system.

13. Absorption refrigeration apparatus comprising a pressure equalizing medium circuit including an absorber and an evaporator of the type in which the refrigerant is propelled therethrough by the pressure equalizing medium, a power driven circulator in the pressure equalizing medium circuit, a solution circuit including a generator and said absorber, a reservoir in the weak solution side of said solution circuit, means operated by said power driven circulator for circulating the solution, means for heating said generator, refrigeration demand responsive means for regulating said heating means, and means responsive to the back pressure of said evaporator for regulating the liquid level in said reservoir.

14. Absorption refrigeration apparatus comprising a pressure equalizing medium circuit including an absorber and an evaporator of the type in which the refrigerant is propelled therethrough by the pressure equalizing medium, a power driven circulator in the pressure equalizing medium circuit, a solution circuit including a generator and said absorber, a reservoir in the weak solution side of said solution circuit, a gas lift pump connected to receive gas from said pressure equalizing medium circuit for elevating lean solution from said reservoir into said absorber, means for heating said generator, refrigeration demand responsive means for regulating said heating means, means for supplying refrigerant vapor produced in said generator to said evaporator in liquid phase, an auxiliary reservoir connected to receive solution from said first-mentioned reservoir, and means connecting said auxiliary reservoir to a portion of the system in which pressure variations occur as a result of changes in the rate at which heat is supplied to said generator.

15. Absorption refrigerating apparatus comprising a pressure equalizing medium circuit including an absorber and an evaporator, a solution circuit including a generator and said absorber, refrigeration demand responsive means for regulating the rate at which refrigerant vapor is produced in said generator, a pump for circulating the pressure equalizing medium, a gas lift pump connected to receive pressure equalizing medium from said pressure equalizing medium circuit for circulating the solution, means responsive to a condition of the system which varies with variations in the rate of refrigerant generation for regulating the rate of solution flow in accordance therewith.

16. Absorption refrigerating apparatus of the pressure equalized type including a generator, an absorber, means for heating said generator, means for applying a substantially constant propelling force to an absorbing solution to circulate the same through said generator and said absorber, and means for altering the quantity of solution circulated per unit of time by said circulating means in accordance with an operating condition of the system which varies with the refrigerating load.

17. Absorption refrigerating apparatus of the pressure equalized type including a generator, an absorber and an evaporator connected in circuit, means for heating said generator, refrigeration demand responsive means for governing the operation of said heating means, a pump for circulating an absorbing solution through said absorber and said generator, and means responsive to a condition of the system which varies with variations in refrigerating load for varying the effective resistance to circulation of the absorbing solution by said pump.

18. Absorption refrigerating apparatus including a generator, an absorber, an evaporator, means for liquefying refrigerant vapor produced in said generator and for supplying the liquid to said evaporator, means providing for circulating of inert gas between said evaporator and said absorber, means including a gas lift pump providing for circulation of absorption solution between said absorber and said generator, and means for altering the quantity of solution circulated per unit of time by said gas lift pump in accordance with an operating condition of the system which varies with the refrigerating load.

19. Absorption refrigerating apparatus including a generator, an absorber, an evaporator, means for liquefying refrigerant vapor produced in said generator and for supplying the liquid to said evaporator, means providing for circulation of inert gas between said evaporator and said absorber, means including a gas lift pump providing for circulation of absorption solution between said absorber and said generator, and means responsive to a condition of the system which varies with variations in refrigerating load for varying the effective resistance to circulation of the absorbing solution by said gas lift pump.

JUSTICE H. BEACH.